(12) United States Patent
Jagota

(10) Patent No.: US 9,477,698 B2
(45) Date of Patent: Oct. 25, 2016

(54) SYSTEM AND METHOD FOR INFERRING REPORTING RELATIONSHIPS FROM A CONTACT DATABASE

(71) Applicant: salesforce.com, inc., San Francisco, CA (US)

(72) Inventor: Arun Kumar Jagota, Sunnyvale, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 165 days.

(21) Appl. No.: 13/773,221

(22) Filed: Feb. 21, 2013

(65) Prior Publication Data

US 2013/0218904 A1    Aug. 22, 2013

Related U.S. Application Data

(60) Provisional application No. 61/601,656, filed on Feb. 22, 2012.

(51) Int. Cl.
G06F 17/30    (2006.01)

(52) U.S. Cl.
CPC ... G06F 17/30312 (2013.01); G06F 17/30539 (2013.01)

(58) Field of Classification Search
CPC .................. G06F 17/30312; G06F 17/30539
USPC ......................................................... 707/748
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,829,003 A * | 10/1998 | Okura | |
| 5,831,610 A | 11/1998 | Tonelli et al. | |
| 5,873,096 A | 2/1999 | Lim et al. | |
| 5,893,107 A * | 4/1999 | Chan ................. G06F 17/30607 |
| 5,918,159 A | 6/1999 | Fomukong et al. | |
| 5,930,764 A * | 7/1999 | Melchione et al. ......... 705/7.29 |
| 5,930,806 A * | 7/1999 | Taira et al. | |
| 5,953,724 A * | 9/1999 | Lowry | |
| 5,963,953 A | 10/1999 | Cram et al. | |

(Continued)

OTHER PUBLICATIONS

Zou, Chendong, et al., "Back to the Future: Dynamic Hierarchical Clustering", ICDE 1998, Orlando, FL, Feb. 23-27, 1998, pp. 578-587.*

Singh, Lisa, et al., "Generating Association Rules from Semi-Structured Documents Using an Extended Concept Hierarchy", CIKM '97, Las Vegas, NV, Nov. 10-14, 1997, pp. 193-200.*

The American Heritage College Dictionary, 4th Edition, Houghton Mifflin Co., Boston, MA, © 2002, p. 1110.*

(Continued)

*Primary Examiner* — Robert Stevens
(74) *Attorney, Agent, or Firm* — Dergosits & Noah LLP; Todd A. Noah

(57) ABSTRACT

A system and method for inferring reporting relationships from contact records. Contact records from a single company are identified, and each record is ranked based on the title. A probabilistic analysis is used to compare the number of contacts on the current level with the number of contacts on a lower level, and make a guess as to reporting relationships between contacts on the different levels. If a confidence score of a guessed reporting relationship is high enough, the reporting relationship is accepted, and contact records updated.

21 Claims, 10 Drawing Sheets

(56) References Cited

U.S. PATENT DOCUMENTS

| | | | |
|---|---|---|---|
| 5,966,695 A * | 10/1999 | Melchione et al. | 705/7.33 |
| 5,974,407 A * | 10/1999 | Sacks | G06F 17/30595 |
| 6,092,083 A | 7/2000 | Brodersen et al. | |
| 6,122,641 A * | 9/2000 | Williamson et al. | 707/793 |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,208,984 B1 * | 3/2001 | Rosenthal | 707/783 |
| 6,216,135 B1 | 4/2001 | Brodersen et al. | |
| 6,233,617 B1 | 5/2001 | Rothwein et al. | |
| 6,247,043 B1 * | 6/2001 | Bates et al. | 709/200 |
| 6,266,669 B1 | 7/2001 | Brodersen et al. | |
| 6,295,530 B1 | 9/2001 | Ritchie et al. | |
| 6,324,541 B1 * | 11/2001 | de l'Etraz et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,453,353 B1 * | 9/2002 | Win et al. | 709/229 |
| 6,523,040 B1 * | 2/2003 | Lo et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,633,311 B1 * | 10/2003 | Douvikas et al. | 715/731 |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,697,807 B2 * | 2/2004 | McGeachie | 707/770 |
| 6,704,744 B1 * | 3/2004 | Williamson et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,760,732 B2 * | 7/2004 | Busshart et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,782,383 B2 | 8/2004 | Subramaniam et al. | |
| 6,789,252 B1 * | 9/2004 | Burke et al. | 717/100 |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,985,955 B2 * | 1/2006 | Gullotta et al. | 709/229 |
| 6,990,495 B1 * | 1/2006 | Grason et al. | |
| 7,062,502 B1 | 6/2006 | Kesler | |
| 7,162,427 B1 * | 1/2007 | Myrick et al. | 705/348 |
| 7,340,411 B2 | 3/2008 | Cook | |
| 7,383,285 B1 * | 6/2008 | Pal et al. | |
| 7,401,094 B1 | 7/2008 | Kesler | |
| 7,539,676 B2 * | 5/2009 | Aravamudan et al. | |
| 7,620,647 B2 * | 11/2009 | Stephens et al. | |
| 7,620,655 B2 | 11/2009 | Larsson | |
| 7,698,160 B2 | 4/2010 | Beaven et al. | |
| 8,010,663 B2 | 8/2011 | Firminger et al. | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,275,836 B2 | 9/2012 | Beaven et al. | |
| 8,364,753 B2 * | 1/2013 | Hill | G06Q 10/10 709/203 |
| 2001/0037324 A1 * | 11/2001 | Agrawal et al. | 707/1 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129017 A1 * | 9/2002 | Kil et al. | 707/6 |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0088322 A1 * | 5/2004 | Elder et al. | 707/103 Y |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0193595 A1 * | 9/2004 | Kaminsky et al. | 707/5 |
| 2004/0199489 A1 | 10/2004 | Barnes-Leon et al. | |
| 2004/0199536 A1 | 10/2004 | Barnes Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0108041 A1 * | 5/2005 | White | G06Q 30/02 705/1.1 |
| 2005/0267887 A1 * | 12/2005 | Robins | G06Q 10/06 |
| 2007/0088585 A1 * | 4/2007 | Maguire | 705/7 |
| 2007/0239721 A1 * | 10/2007 | Ullman et al. | 707/9 |
| 2008/0208735 A1 * | 8/2008 | Balet et al. | 705/39 |
| 2009/0063415 A1 | 3/2009 | Chatfield et al. | |
| 2011/0161139 A1 * | 6/2011 | Maheshwari et al. | 705/7.42 |
| 2013/0024229 A1 * | 1/2013 | Agrawal et al. | 705/7.14 |

OTHER PUBLICATIONS

Halinen, Aino, et al., "The Role of Embeddedness in the Evolution of Business Networks", Scand. J. Mgmt, vol. 14, No. 3, © 1998, pp. 187-205.*

Kuhlmann, Martin, et al., "Role Mining—Revealing Business Roles for Security Administration using Data Mining Technology", SACMAT '03, Como, Italy, Jun. 1-4, 2003, pp. 179-186.*

Anderson, Helén, et al., "Position and Role-Conceptualizing Dynamics in Business Networks", Scand. J. Mgmt, vol. 14, No. 3, © 1998, pp. 167-186.*

* cited by examiner

```
For r = 8 down to 2
    Next unless |C_r| > 0
        # Skip to next level if no contacts at level r; proceed if some contacts

# Guess contacts reporting into each contact in C_r
    R = (r==2 or |C_r| > 0) ? C_{r-1} : C_{r-2}
        # R represents the contacts one level below r, or two levels below r
        # if there are no contacts # at level r - 1 unless r equals 2 m = |R|/|C_r|         # Average number of guessed reporters per reportee
    c = P_λ(m)/|C_r|      # Confidence in a guess
    If c ≥ θ              # Guess only if confidence is sufficiently high
        For every a ∈ R, b ∈ C_r
            Guess a reports to b with confidence c
        End
    End
End
```

*FIG. 6*

SYSTEM AND METHOD FOR INFERRING REPORTING RELATIONSHIPS FROM A CONTACT DATABASE

CLAIM OF PRIORITY

This application claims priority from U.S. Provisional Patent Application No. 61/601,656 entitled a Method for Inferring Reports-To Relationships from a Database of Contacts, by Arun Kumar Jagota, filed Feb. 22, 2012, which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the records of the United States Patent and Trademark Office, but otherwise reserves all rights.

TECHNICAL FIELD

The subject matter disclosed herein relates generally to database records management, and more particularly, to infer reporting relationships between using records of the same company using a probabilistic analysis.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which may be unique on their own.

In conventional database systems, users access their data resources in a single logical database. A user of such a conventional database system typically retrieves data from and stores data on the database system using the user's own computing systems or devices. For example, a user system might remotely access one of a plurality of server systems that might in turn access the database system. Data retrieval from the system might include the issuance of a query from the user system to the database system. The database system might process the request for information received in the query and send to the user information from the database system relevant to the request. The retrieval of accurate information and subsequent delivery of this information to the user system in a timely and efficient manner has been and continues to be a goal of administrators of database systems.

However, in a multi-tenant database system ("MTS"), various elements of hardware and software of the database system may be shared by one or more customers. The notion of "cloud computing" has recently developed whereby service providers offer access to hardware/software systems through a network, such as the Internet. For example, a specified application server may simultaneously process requests for many different customers, and a specified database table may likewise store data for many different customers.

In the MTS environment, customers demand up-to-date, comprehensive data. For example, sales and marketing organizations need accurate and up-to-date contact information in order to maintain good relations with existing customers as well as solicit leads for new customers. Unfortunately, conventional database approaches rely on individuals to maintain their own contact information, and therefore, even within a single organization, individuals may have inconsistent and/or inaccurate contact information.

An advantage of the MTS system is that business enterprises may share data resources, and rely on the MTS provider to maintain accurate up-to-date data, such as personal and/or business contact information. Another advantage is that all personnel within a single enterprise have access to the exact same contact information, so that inaccuracies or inconsistencies within the organization no longer exist. Yet another advantage is that the MTS system can provide value-added services to enhance the data stored as contact information in the MTS contact database. For example, one type of information that is commonly missing from contact databases is reporting relationships within a company. Such information can be very useful, for example, in marketing efforts. Accordingly, it is desirable to provide techniques in the database for inferring reporting relationships between contacts in individual companies.

BRIEF DESCRIPTION OF THE DRAWINGS

In the following drawings, like reference numbers are used to refer to like elements. Although the following figures depict various examples, the one or more implementations are not limited to the examples depicted in the figures.

FIG. 6 is a software code listing for the method of FIG. 5.

DETAILED DESCRIPTION

1. Simplified System Overview

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query refers to a set of steps used to access information in a database system.

Figure 1:
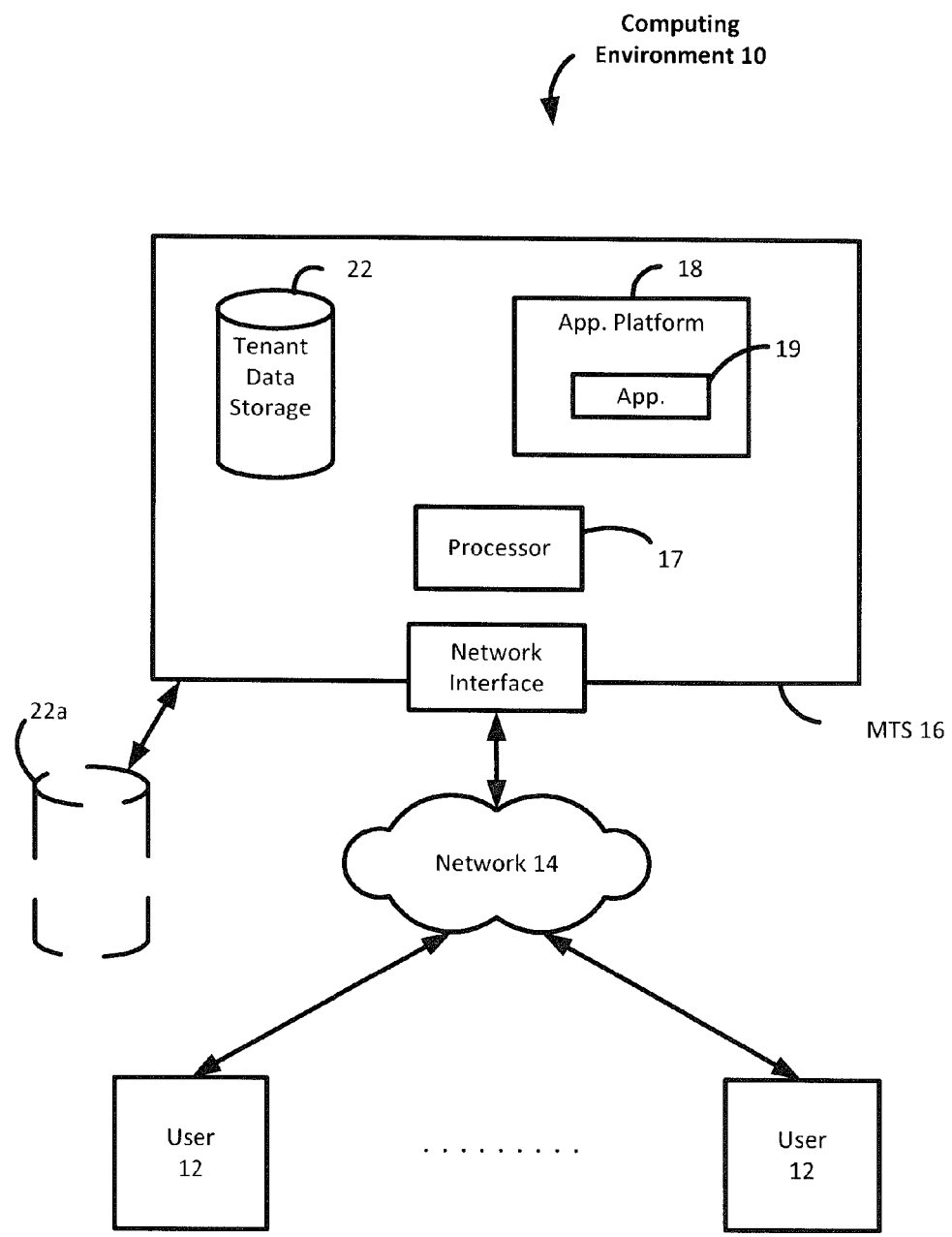
FIG. 1 is a simplified block diagram illustrating a multi-tenant database system ("MTS").
Figure 2:
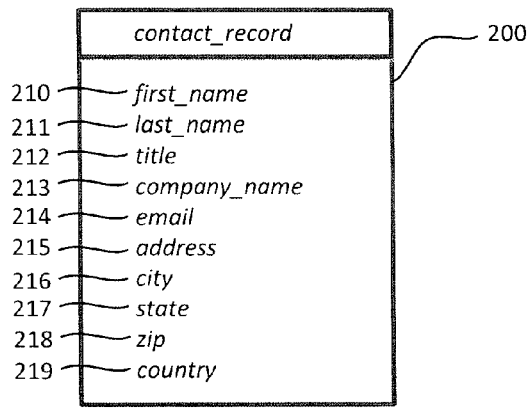
FIG. 2 is a block diagram illustrating a contact record.
Figure 10:
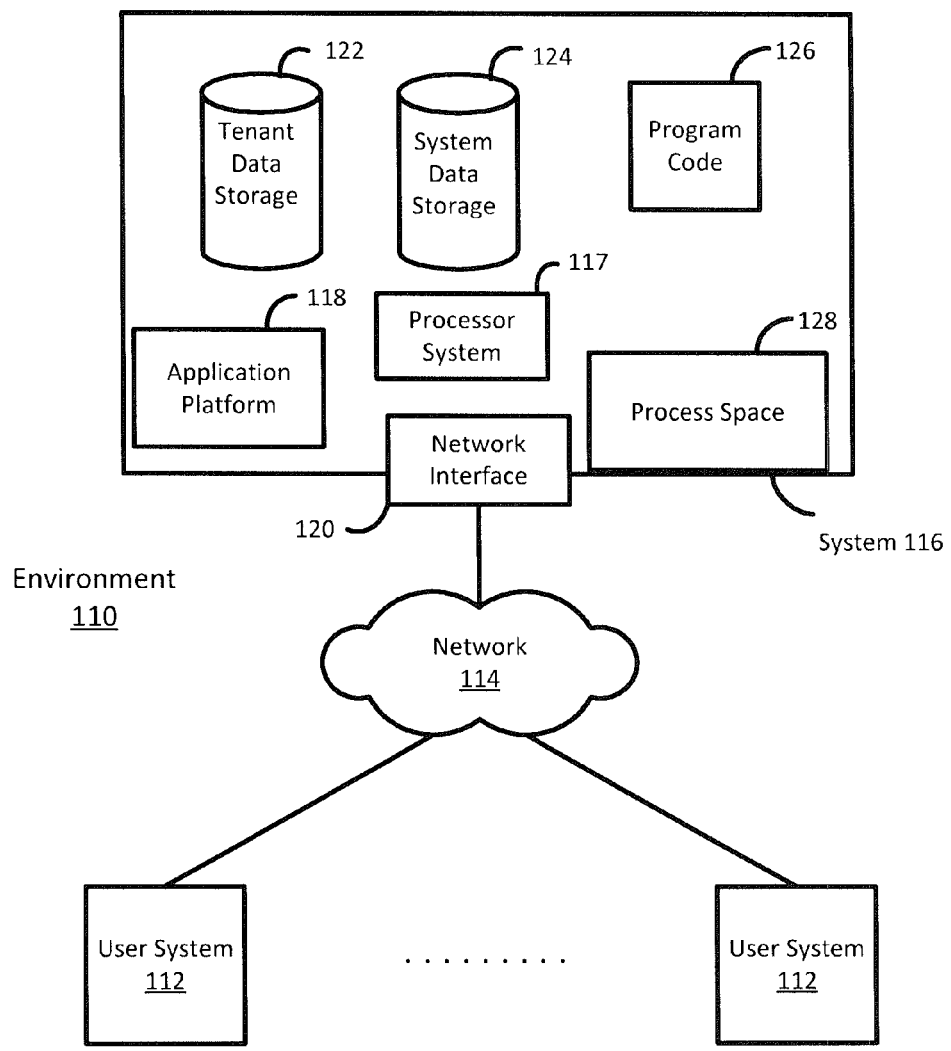
FIG. 10 illustrates a block diagram of an example of an environment wherein an on-demand database service might be used.
Figure 11:
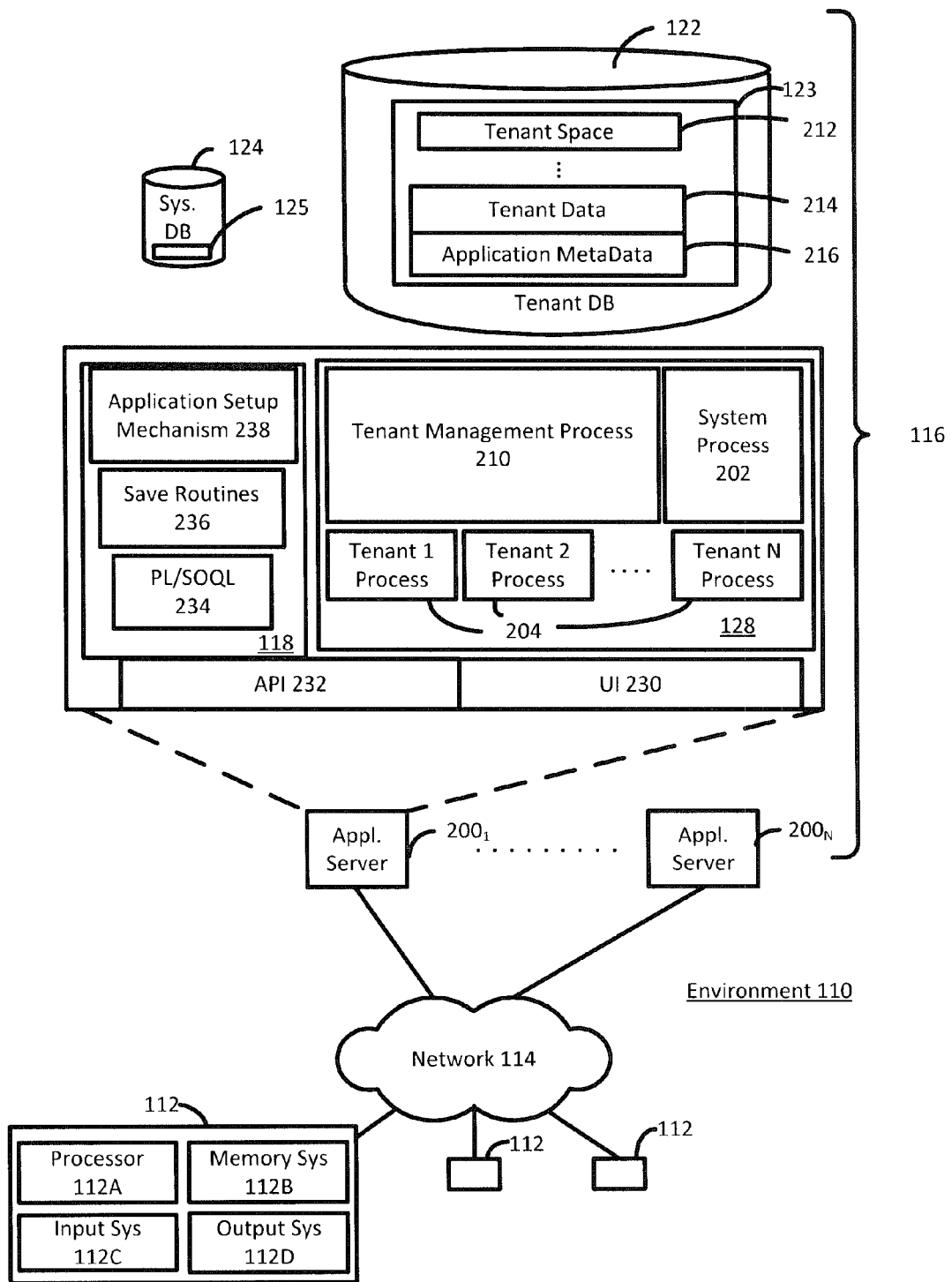
FIG. 11 illustrates a block diagram of an embodiment of elements of FIG. 10 and various possible interconnections between those elements.

FIG. 1 illustrates an embodiment of an on-demand, multi-tenant database service ("MTS") 16 operating in a computing environment 10. User devices or systems 12 access and communicate with the MTS 16 through network 14 in a known manner. More detailed examples for implementing the MTS 16 are shown in FIGS. 10-11, described below. For example, user devices 12 may be any computing device, such as a desktop, laptop, table, smartphone, etc. Network 14 may be any type of computing network, such as the Internet, local area network, wide area network, etc. The operation of the MTS 16 is controlled by a processor system 17 running an operating system.

The MTS 16 provides the users of user systems 12 with access to many features and applications available on or through MTS 16. In particular, the MTS 16 includes tenant data storage 22, which is configured through the MTS to maintain tenant data for multiple users/tenants, as further described below and in the patent references mentioned above. Tenant data storage 22 (shown in dashed lines) may be physically incorporated within MTS 16, or may alternatively be remote storage 210 (shown in dashed lines), likewise accessible and useful to the MTS to support user systems 12.

Figure 3:
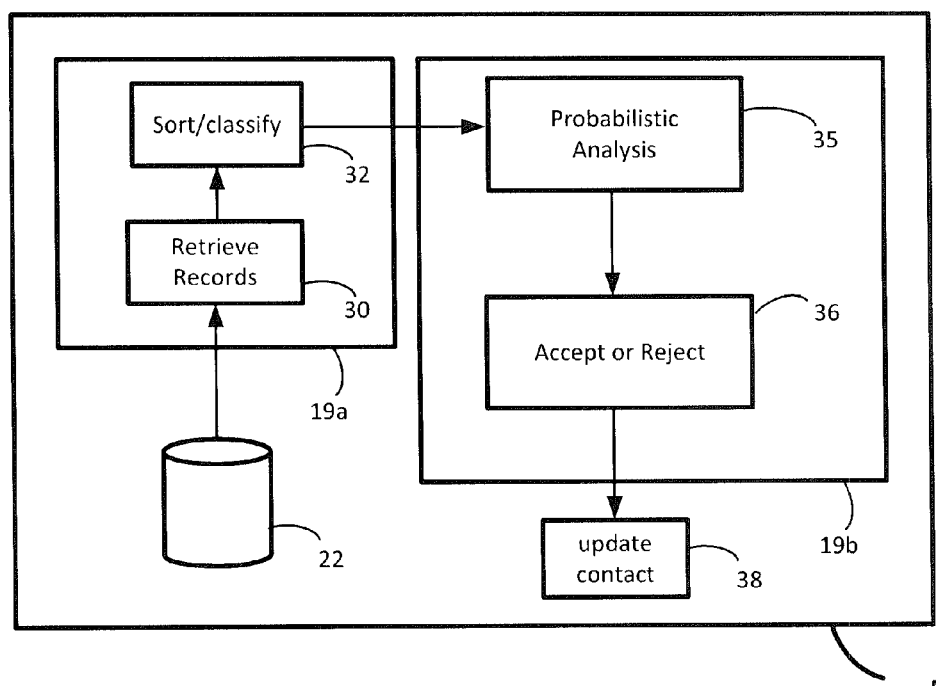
FIG. 3 is a block diagram illustrating the operational flow caused by program instructions for inferring reporting relationships between contacts stored in the MTS.

There are many types of tenant data that may be maintained in tenant data storage 22, including, in particular, contact data, i.e., information about an individual, including name, company, address, telephone number, etc. FIG. 3 illustrates a typical database record 300 for a contact. In this embodiment, the contact record 300 has 10 defined fields or entities: first_name 310, last_name 311, (job) title 312, company_name 313, email 314, address 315, city 316, state 317, zip 318, and country 319. Other fields or other formats may be used.

An important objective for any user of MTS 16 is to maintain up-to-date and detailed information for all contacts. A unique feature of MTS 16 described herein is one or more applications 19, managed and operated by the MTS through its application platform 18, that facilitate this objective by providing one or more sets of program instructions providing features to help maintain and secure the accuracy and reliability of the contact data, as well as enhance the data. For example, instructions may be provided for inferring relationships between contact records of the same company.

Figure 4:
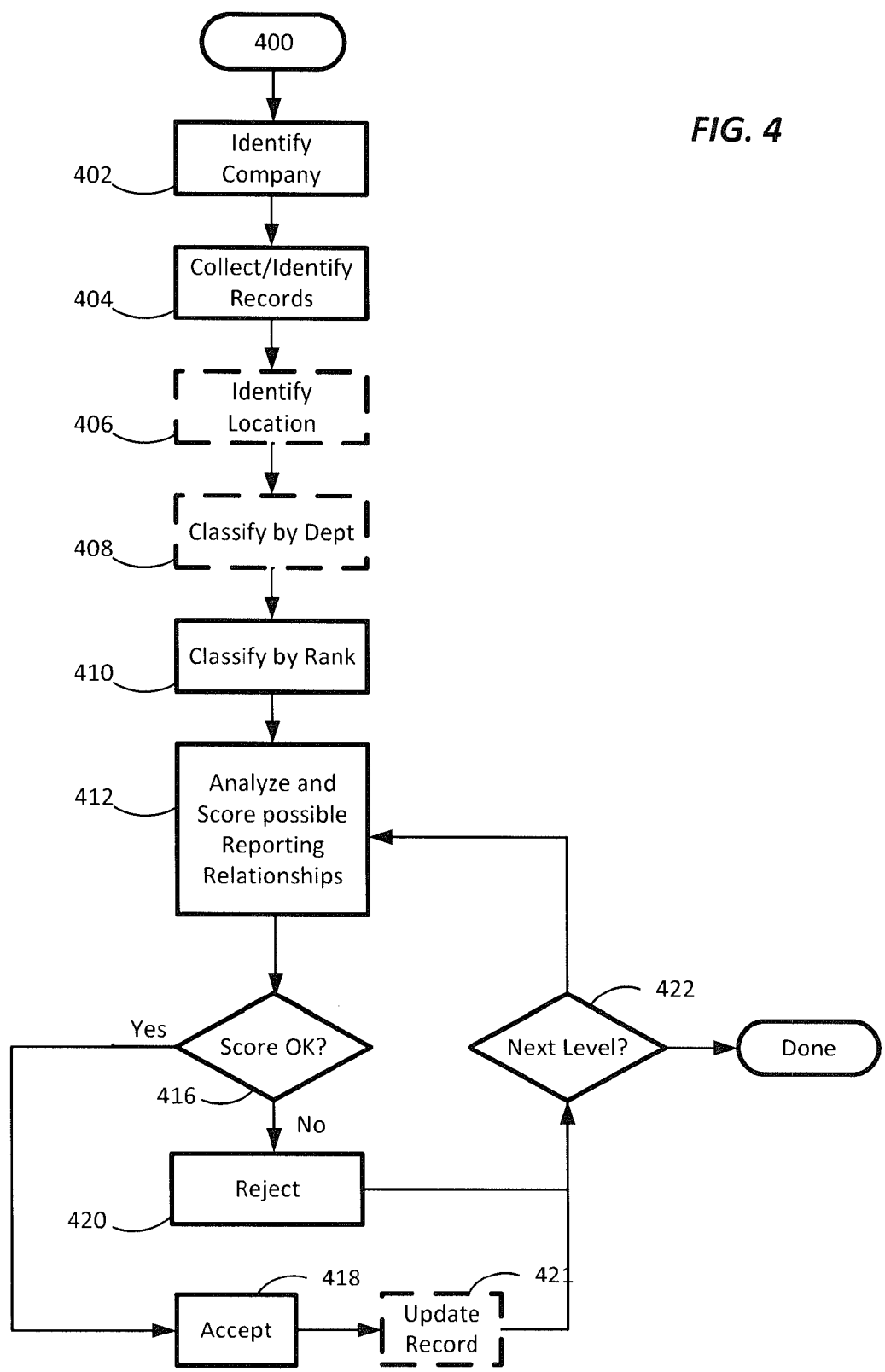
FIG. 4 is a flow chart illustrating one embodiment of a process for inferring reporting relationships using a probabilistic analysis.

The block diagram shown in FIG. 4 illustrates the operation of an application 19a that handles simple pre-processing steps, and application 19b, which handles processing and probabilistic calculations. Although two applications 19a and 19b are shown as part of the MTS 16, these applications may implemented in one or more parts or modules, and may also be located elsewhere but accessible to the MTS. Also, the construction of suitable program code and interaction between different code modules can vary greatly according to need and/or desire and thus the illustrated embodiments are not intended to limit how various software solutions may be implemented.

In application 19a, a first program module 30 has program code suitable to retrieve contact records from data storage 22, which are then sorted and classified by a second program module 32. For example, a method for inferring reporting relationships will require contact records from the same company be identified, then sorted according to department and/or location, then ranked. The creation of program code suitable to retrieve, sort and classify documents as in modules 30 and 32 is routine for those skilled in these arts and need not be described in further detail herein.

Once the pre-processing steps identify and rank a set of documents from the same company, then a set of calculations is performed in a probabilistic analysis module 34. Using the rank information, application 19b infers reporting relationships using probabilistic analysis over all levels of the organization, and calculates a confidence score for the inferred relationship. If the confidence score is compared to a threshold in module 36, and based on the confidence score, the inference is either accepted or rejected.

Once a reporting relationship is identified and accepted, one or more contact records may be updated with module 38 to enhance or enrich the stored contact information.

2. Inferring Reporting Relationships from Contacts

Referring now to FIG. 4, a process 400 is illustrated for inferring company reporting relationships from contact information stored as records in a contact database. The knowledge of these relationships can be important for many reasons, for example, in sales and marketing efforts. The process 400 is preferably implemented as one or more sets of computer-executable program instructions organized as one or more program modules and installed on a computing device either as part of the computer operating system to control the contact database, or as a discrete application(s) running on top of the operating system. The process 400 may be initiated in various ways, for example, by a user query, or run as part of a regular maintenance routine for the contact database.

In step 402, the name of a company of interest is identified. In step 404, the database collects or identifies all contact records in the database having the selected company name in the company_name field of the record. For example, copies of these records may be placed into temporary storage for processing, or other links or records may be created by the database to facilitate record handling and processing.

In step 406, the database further limits selection to only those contact records having the same location, e.g., matching city and state fields, or address fields if multiple company locations within the same city, etc. Step 406 is optional, and hence shown in dashed line, but it is preferred to include this step since most direct reporting relationships involve company employees at the same location.

In step 408, each contact record is classified by department on the basis of the content in the title field, since many reporting relationships exist completely within the same department. As an example, the title of Vice President of Sales and Marketing may be classified to two different departments: Sales and/or Marketing. This classification step really involves an educated guess, which may be machine-evaluated based on the content in the title field, for example, by using a look up table to match terms to known department names, or using probabilistic techniques to score and accept or reject possible department names. Department names may become known over time through machine learning methods using training sets, for example, and a lookup table stocked and updated with results of such methods. As with step 406, step 408 is optional but preferred.

In step 410, a rank is assigned to each contact record, also on the basis of the content in the title field. In one embodiment, the rank is a number in correspondence with the management level of the contact in the company, starting with the lowest manager up to the top executive. For example, a typical corporate hierarchy is shown in Table I below, in which a first level or Staff level manager has rank r=1; a Manager level has rank r=2; a Senior Manager level has rank r=3; a Director level has rank r=4; a Senior Director level has rank r=5; a Vice-President level has rank r=6; a Senior Vice-President level has a rank r=7; an Executive Vice-President has a rank r=8; and the top level includes the Chief Executive Officer and the Chief Operating Officer, with rank r=9. While the example shown in Table I below is typical, it is one embodiment and other variations may of course exist in large and small organizations.

TABLE I

| Rank Name | Rank Number |
|---|---|
| Staff-level | 1 |
| Manager-level | 2 |
| Senior Manager-level | 3 |
| Director-level | 4 |
| Senior Director-level | 5 |
| VP-level | 6 |
| Senior VP-level | 7 |
| EVP-level | 8 |
| C -level (CEO, COO) | 9 |

In step 412, a probabilistic analysis is performed on each level of the organization in order to infer plausible reporting relationships between lower ranking contacts and higher ranking contacts within the company. For example, consider a pair of contacts a and b in the same company, where contact a reports to contact b. Contact a is referred to as the reporter and contact b is referred to as the reportee. For each level of the organization, the probabilistic analysis of step 412 results in an educated guess as to the reporting relationship between contact a and contact b, and a confidence score c in that guess, namely, a reports to b with confidence c.

Figure 5:
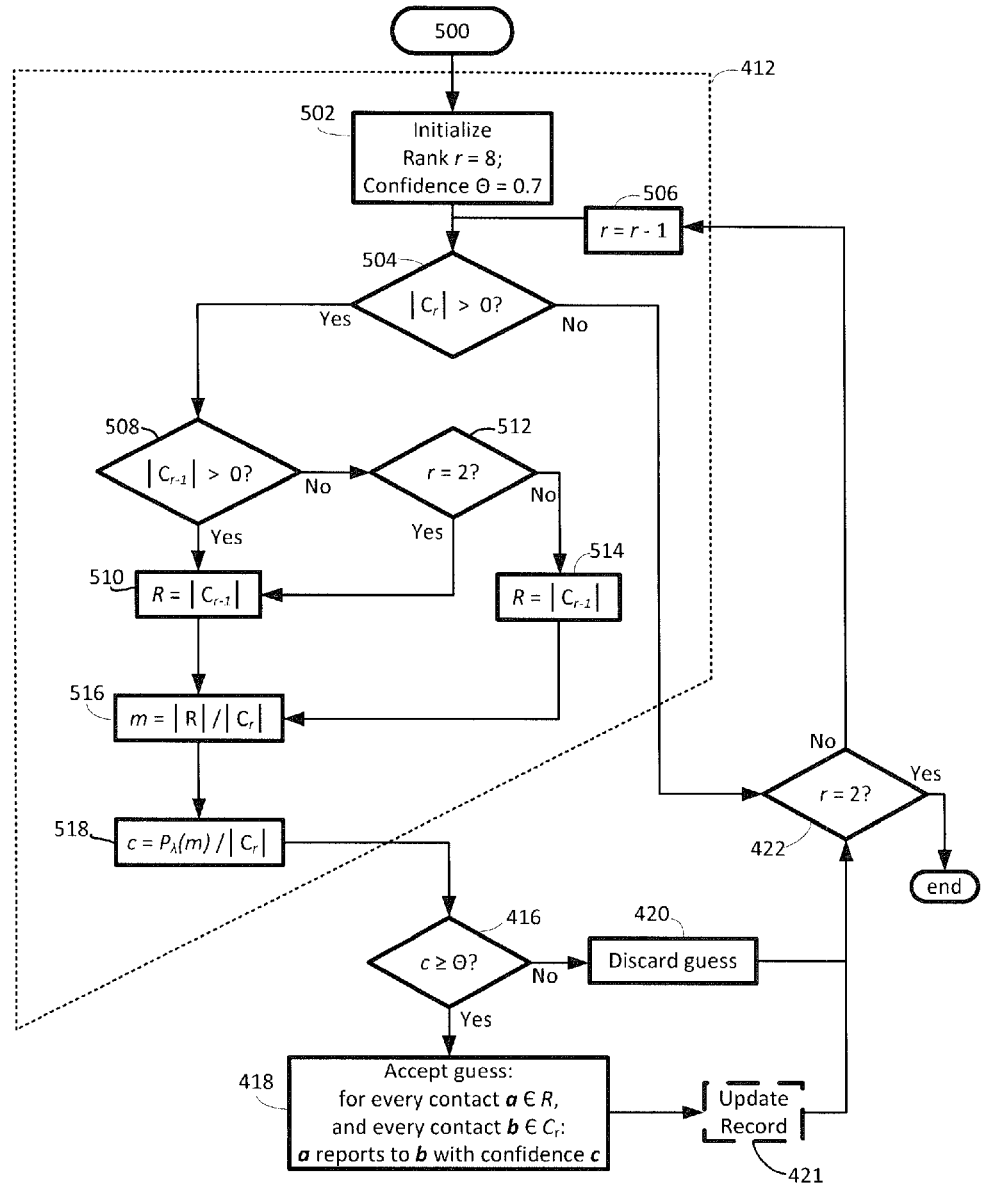
FIG. 5 is a flow chart illustrating a detailed embodiment of a method for the probabilistic analysis of FIG. 4.

The probabilistic analysis is based on a model of the number of reporters to any one reportee, using a Poisson probability distribution $P_\lambda$ of the reporter/reportee space, where $\lambda$ is the distribution mean. One embodiment of probabilistic analysis 412 is shown in FIG. 5 and described in more detail below. Other applications of probabilistic techniques are disclosed in commonly owned, co-pending U.S. patent application Ser. No. 13/773,141, entitled System and Method for Using a Statistical Classifier for Contact Entities, by Arun Kumar Jagota, filed Feb. 21, 2013, and U.S. patent application Ser. No. 13/034,463 entitled Probabilistic Tree-Structured Learning System for Extracting Contact Data From Quotes, by Arun Kumar Jagota, filed Feb. 24, 2011, both of which are incorporated herein by reference.

In step 416, if the confidence score c is high enough, the guess will be accepted in step 418, or rejected in step 420. After accepting a guess in step 418, one or more contact records may be updated in step 421 to include reporting relationships. Step 421 is optional but preferred. Step 422 determines whether to proceed to the next level, and if so, the process returns to step 412 to evaluate reporting relationships based at the next level. If all levels have been evaluated at step 422, the process ends.

To illustrate, suppose a company search reveals 7 contacts in the contact database with titles as shown in Table II:

TABLE II

| Title | # Contacts | Rank |
|---|---|---|
| Vice-President of Engineering | 1 | 6 |
| Director of Engineering | 2 | 4 |
| Engineering Manager | 4 | 2 |

The department classifier of step 408 may reasonably classify these contacts as part of the Engineering department. The rank classifier of step 410 may reasonably mark the title of Vice President of Engineering as a VP-level (rank r=6); the title of Director of Engineering as a Director-level (rank r=4); and the title of Engineering Manager as Manager-level (rank r=2).

The probabilistic analysis first considers the top-most reporting level, i.e., which contacts report to the VP of Engineering. In this example, a plausible guess is that the two directors of engineering report to the VP, and a high confidence in that guess is assigned. Next, the probabilistic analysis tries to guess which contacts report to the Director of Engineering. The result is that the 4 Engineering managers are considered reporters, but there are also 2 reportees in the level above them, so it is difficult to resolve who reports to whom from the available data. Thus, the confidence levels are lower at this level, which leads to a generalization that in the lower ranks, confidence in the guesses made by the probabilistic analysis may decrease. Fortunately, it is the higher ranking relationships that are typically of most interest, and these guesses tend to have a higher confidence level. However, it may be useful in some applications to keep guesses at relationships that score lower, as in the example above, it may be useful to guess that each of the 4 engineering managers reports to one or the other of the 2 directors, and to include that information on one or more contact records.

In one embodiment, the confidence score may be boosted when there is a single candidate reportee and only a few candidate reporters. In contrast, when there are a large number of candidate reporters, the confidence score of any one guess may be lowered, irrespective of whether there is a small or a large number of candidate reportees. In the latter case, it is difficult to guess with confidence which reporter reports to which reportee, at least without more information. In the former case, it may be that something the data is incorrect or incomplete or perhaps there are more candidate reportees not yet in the database. Alternatively, many of the candidate reporters may have left the company and, therefore, the contact database is accurate and complete.

Referring now to FIG. 5, a detailed process embodiment 500 of the probabilistic scoring analysis of step 412 is illustrated. In step 502, relevant parameters are initialized since the process will iterate through at least several levels of organizational hierarchy as represented by the rank r. The initial rank r is set to one level below the top level. The top level will be treated differently as described further below. For the rankings shown in Table I, the rank r is initially set to 8. Further, a confidence threshold θ may be set based on experience or other external factors. In this example, the confidence threshold θ is set at 60%.

In step 504, the number of contacts at the current rank r, shown notationally as $|C_r|$, is compared to zero. If there are no contacts at this level, then the rank r is compared to 2 in step 505, and if not equal, then the rank r is decremented in step 506, namely, r=r−1, and the process returns to step 504 to consider reporting relationships at the next level. If the current rank r is equal to 2 in step 505, then this was the last iteration, and the probabilistic analysis is complete for this company.

If the number of contacts at the current rank, $|C_r|$, is greater than zero at step 504, then the number of contacts at the next rank, $|C_{r-1}|$, is considered in step 508. If the number of contacts at the next rank $|C_{r-1}|$ is greater than zero at step 508, then in step 510, the value of a variable R is set equal to that number of contacts at the next level, i.e., $R=|C_{r-1}|$, and the process proceeds to step 516 for calculations.

If the number of contacts at the next rank $|C_{r-1}|$ is not greater than zero at step 508, then the current rank r is compared to 2 in step 512. If r=2, then this is the last level of comparison, and R is set=$|C_{r-1}|$ back in step 510. If the rank is not 2 in step 512, then in step 514, R is set=$|C_{r-2}|$, i.e., the count of reporter contacts two levels below, whether or not the count is zero on that level.

Steps 510 and 514 then both lead to calculations beginning in steps 516 and 518. In step 516, the variable m is calculated to represent the average number of guessed reporters per reportee, that is, the number of contacts at level r−1, $R=|C_{r-1}|$, divided by the number of contacts at level r, $|C_r|$:

$$m=|R|/|C_r|$$

In step 518, the variable c is calculated to represent a score or confidence in a guess, as the Poisson probability distribution of the average number of guessed reporters per reportee, $P_\lambda(m)$, divided by the number of contacts at level r, $|C_r|$:

$$c=P_\lambda(m)/|C_r|$$

In step 520, the confidence score c is compared to the confidence threshold θ set in the initialization step 502. If the score c is greater than or equal to the threshold θ, the guess is accepted. More specifically, for every contact a that is an element of R, and for every contact b that is an element of $C_r$, contact a reports to contact b with confidence c. If the confidence score c is below the threshold θ, the guess may be discarded in step 524. In either event, the process returns to step 505 to see if current rank r=2, and if not, the process iterates at the next level, and if so, the process ends. One example of a program coding for process 500 is shown in FIG. 6. Table III below shows examples of confidence score values for various values of $|C_r|$ and $|R|$.

TABLE III

| $|C_r|$ | $|R|$ | c |
|---|---|---|
| 1 | 5 | 1 |
| 1 | 20 | 1.51E−06 |
| 1 | 6 | 0.833333 |
| 2 | 10 | 0.5 |
| 1 | 4 | 1 |
| 10 | 30 | 0.08 |

In the example of Table III, ratios on the order of 4, 5 or 6 candidate reporters for a single candidate reportee result in a high confidence score c. At the other extremes, when there is one candidate reportee and 20 candidate reporters, or when there are 10 candidate reporters and 30 candidate reportees, the confidence scores will be low.

Figure 7:
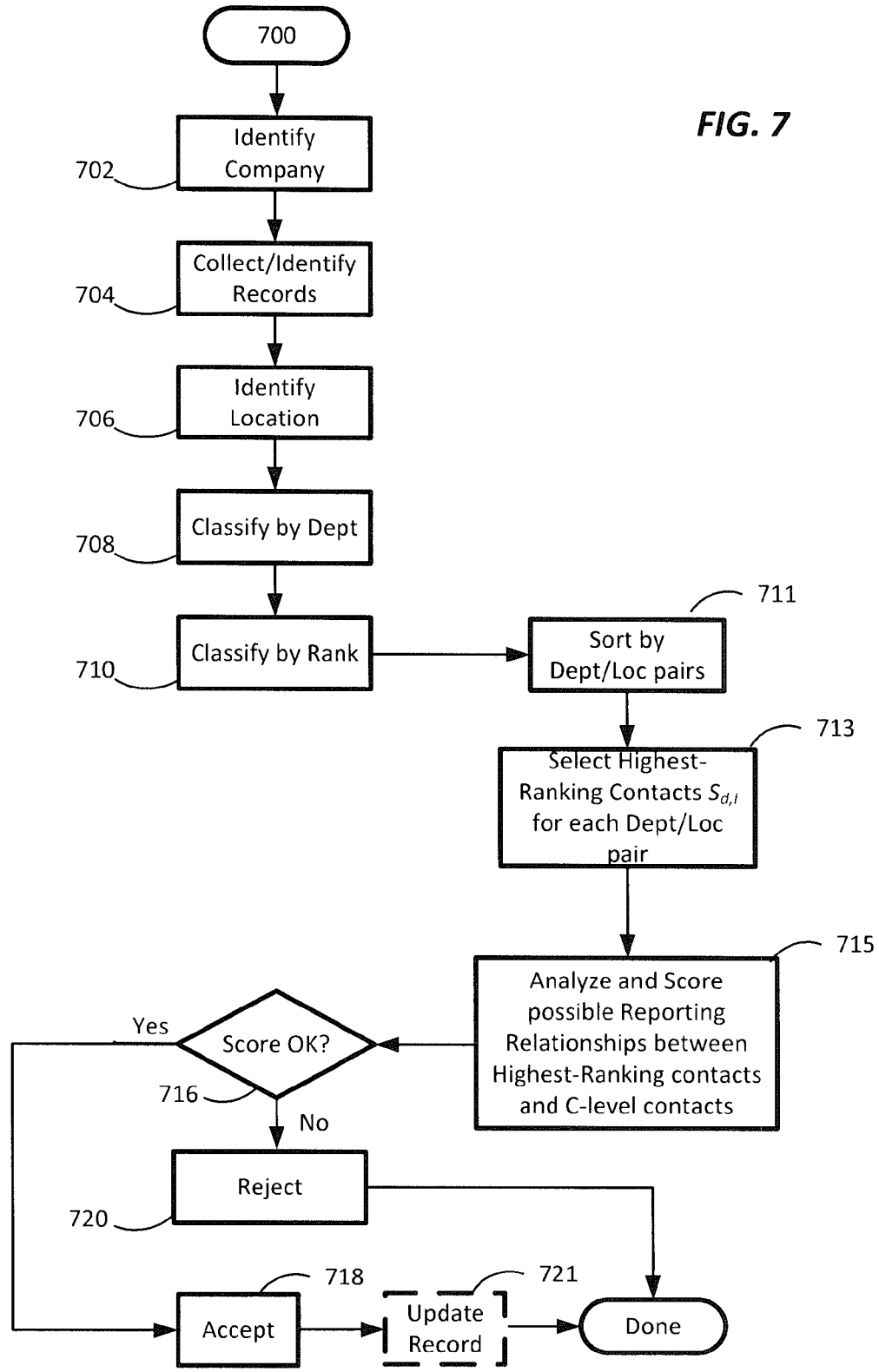
FIG. 7 is a flow chart illustrating an embodiment of a process for inferring reporting relationships for top level executives using a probabilistic analysis.

In an embodiment, for the case of C-level employees, such as CEO and COO, a different process 700 is used as shown in FIG. 7. The process 700 is similar to process 400, and starts with the following steps: selecting a company in step 702; identifying contact records in the database having the selected company in step 704; identifying the company location for each record in step 706; classifying each record by department in step 708; and classifying each record by rank in step 710.

At step 711, however, the contact records are sorted according to department-location pairs (D,l). In step 713, the highest-ranking contacts in each department-location pair are identified as set $S_{D,l}$. At step 715, the possible reporting relationships between the set of highest-ranking contacts $S_{D,l}$ identified in step 713 and the C-level contacts is analyzed and scored. For example, FIG. 8 illustrates an embodiment for analyzing and scoring these reporting relationships.

Once again, step 715 yields a score that may compared to a threshold in step 716. If the score exceeds the threshold, the guess is accepted in step 718, record(s) updated in step 721, and the process is done for this company. If the score fails to exceed the threshold in step 716, then the guess is rejected in step 720 and the process is done.

Figure 8:
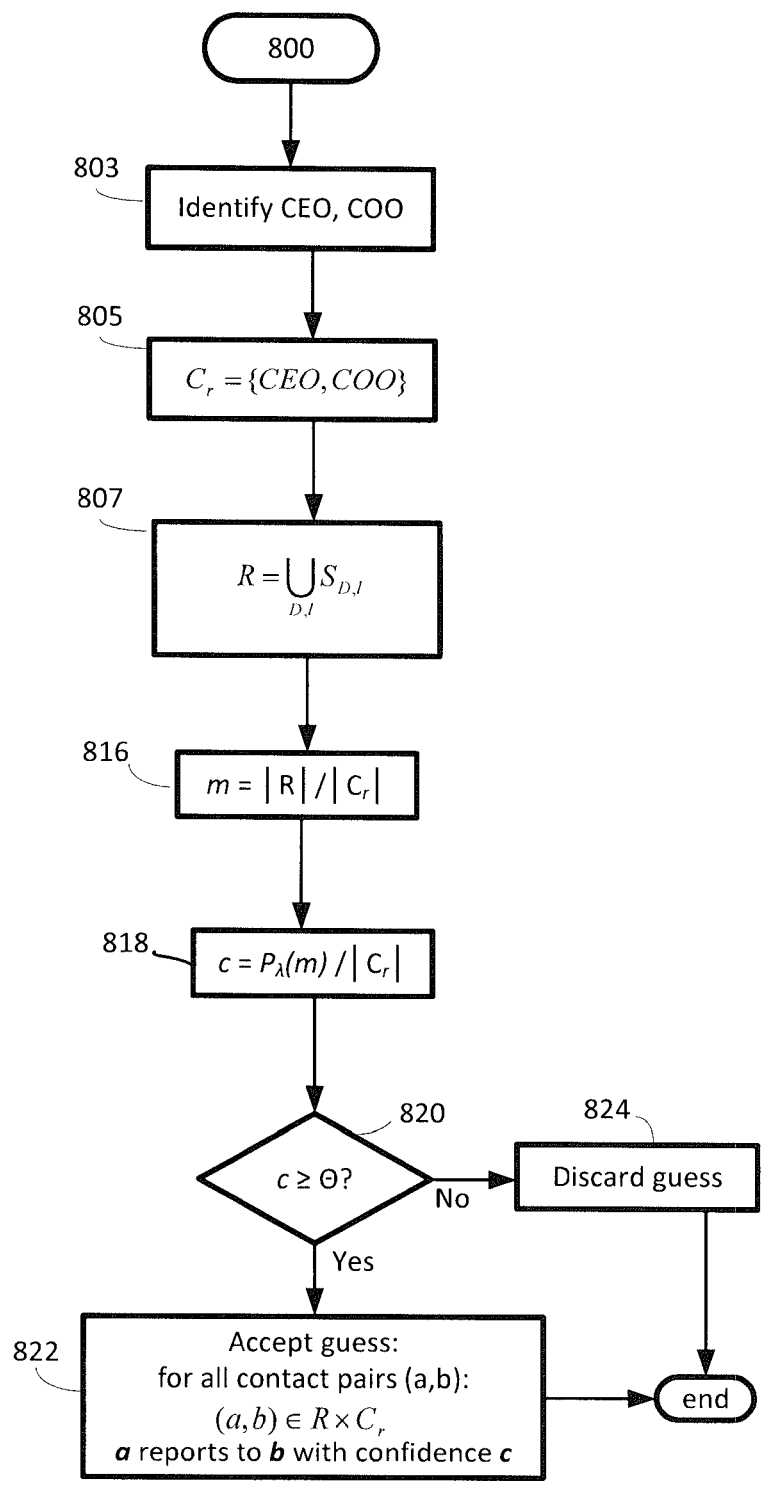
FIG. 8 is a flow chart illustrating a detailed embodiment of a method for the probabilistic analysis of FIG. 7.

FIG. 8 illustrates a detailed process embodiment 800 of the probabilistic scoring analysis of step 715. In step 803, the CEO and COO (if one exists) for the company are identified from the selected contact records. In step 805, in this embodiment, the set of contacts $C_r$ at the C-level includes only the CEO and COO, i.e., $C_r \subset \{CEO,COO\}$. In step 807, the set of contacts R at the level below C-level is taken as the union of all sets of highest-ranking contacts across all department-location pairs (D,l), that is:

$$R = \bigcup_{D,l} S_{D,l}$$

The system may then guess in step 822, for all contact pairs $(a,b) \in R \times C_r$ that a reports to b with the same confidence scoring mechanism as before, namely: in step 816, $m=|R|/|C_r|$, and in step 818, $c=P_\lambda(m)/|C_r|$, when $c \geq \theta$ in step 820. Otherwise, the confidence score is too low and the guess is discarded in step 824.

3. Improved Recall Through Machine Learning

Recall may be defined as the percentage of reporting relationships that actually exist in the company that are discoverable by the methods described herein. Recall can be improved by discovering less common reporting structures, which may be revealed through community feedback or from analysis of actual organizational charts. For example, in some companies, the Chief Technology Officer ("CTO") reports to the VP of Engineering, and not to the CEO. Without more information regarding the reporting relationships, the methods described in the previous section may not make the correct guess. However, a machine learning component can supplement the methods already described. For example, an input stream of actual examples of reporting relationships may be obtained, where each example is of the form: (reporter title, reportee title). Such a system can learn to more informed guesses when probabilistic analysis is combined with machine learning.

To formalize the machine learning component, let T={(r, t)} denote a training multi-set of examples, where r and t are the titles of the reporter and the reportee, respectively, and e=(r,t) is one pair in the set. Examples for such a training set could be drawn from various sources, such as actual organizational charts, web crawling, and community feedback, to name a few.

From such a training set, a posterior probability distribution can be constructed:

$$P(t \mid r) = \frac{|\{e \in T | e = (r, t)\}|}{|\{e \in T | (\exists\, t')(e = (r, t'))\}|}$$

Figure 9:
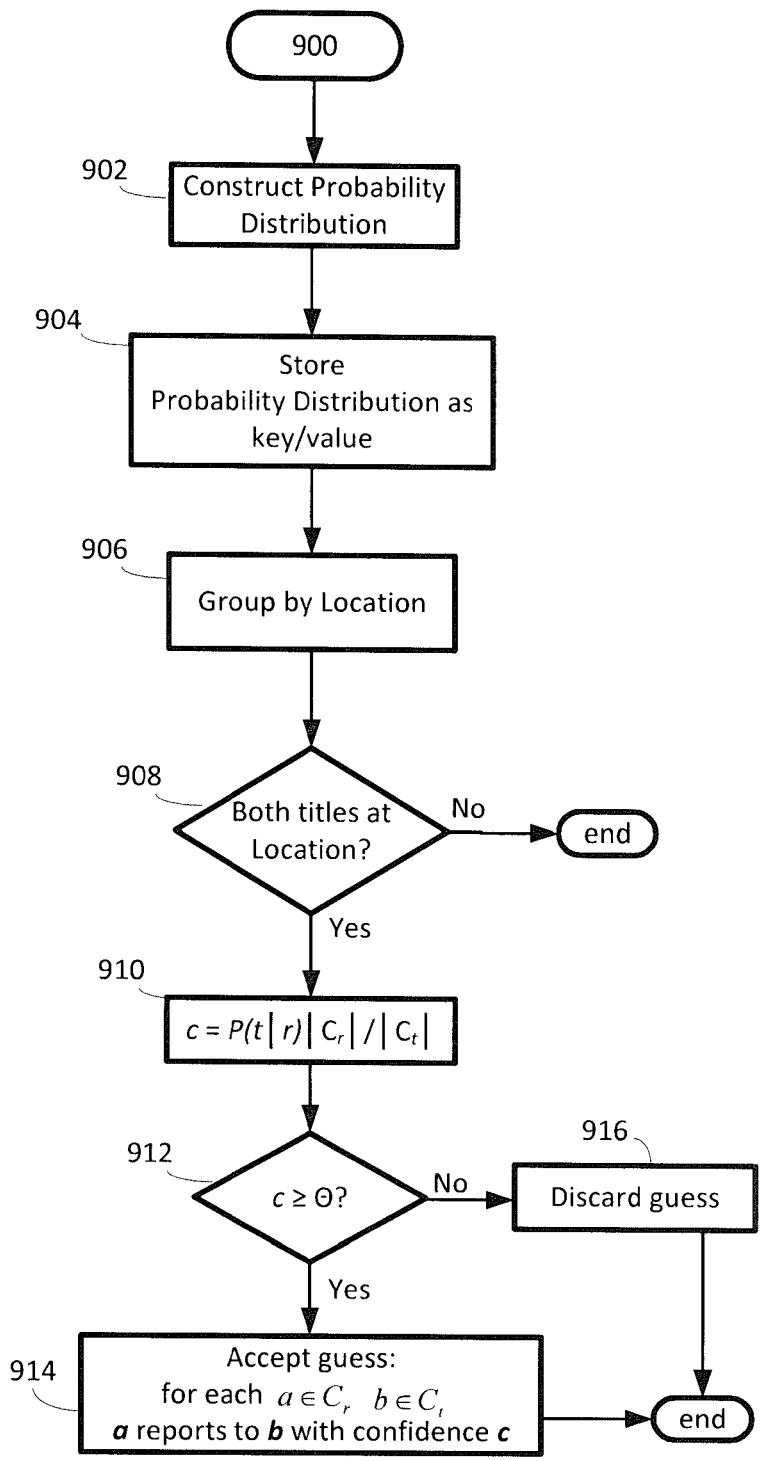
FIG. 9 is a flow chart illustrating a method for machine learning to supplement the probabilistic analysis methods.

This posterior probability distribution represents the fraction of reporters whose title is r who report to a person whose title is t. Thus, additional guesses, beyond those made by the methods described previously, can be made using this training set, for example, with the process shown in FIG. 9. First, in step 902, the probability distribution P(t|r) is constructed from one or more training sets. In step 904, the probability distribution P(t|r) is represented as a key/value map and stored in local or distributed memory. The key is the title of reporter r, and the value associated with r is {t,P(t|r)} for those title of reportees t whose P(t|r) is sufficiently high.

In step 906, the selected contacts are grouped by location. Further grouping by department is not performed in this example, because the machine learning system is left open to the possibility of reporting relationships that cross department boundaries.

In step 908, an inverted index is used on the titles at a specific location to efficiently find, for each pair (r,t) in which the title r is not one or two ranks lower than title t, whether this location has both r titles and t titles. In this situation, $C_r$ and $C_t$ denote the sets of contacts at this location having title r and t, respectively and both sets are assumed to be non-empty. In step 910, the confidence c=P(t|r)|$C_r$|/|$C_t$|. If the confidence score c is greater than the threshold in step 912, then in step 914, for each a∈$C_r$, b∈$C_t$, the system guesses that a reports to b with confidence c. If the confidence score c is not greater than the threshold in step 912, then in step 916, the guess is discarded.

4. Detailed System Description

FIG. 10 is a block diagram of an exemplary environment 110 for use of an on-demand database service. Environment 110 may include user systems 112, network 114 and system 116. Further, the system 116 can include processor system 117, application platform 118, network interface 120, tenant data storage 122, system data storage 124, program code 126 and process space 128. In other embodiments, environment 110 may not have all of the components listed and/or may have other elements instead of, or in addition to, those listed above.

User system 112 may be any machine or system used to access a database user system. For example, any of the user systems 112 could be a handheld computing device, a mobile phone, a laptop computer, a work station, and/or a network of computing devices. As illustrated in FIG. 10 (and in more detail in FIG. 11), user systems 112 might interact via a network 114 with an on-demand database service, which in this embodiment is system 116.

An on-demand database service, such as system 116, is a database system that is made available to outside users that are not necessarily concerned with building and/or maintaining the database system, but instead, only that the database system be available for their use when needed (e.g., on the demand of the users). Some on-demand database services may store information from one or more tenants into tables of a common database image to form a multi-tenant database system (MTS). Accordingly, the terms "on-demand database service 116" and "system 116" will be used interchangeably in this disclosure. A database image may include one or more database objects or entities. A database management system (DBMS) or the equivalent may execute storage and retrieval of information against the database objects or entities, whether the database is relational or graph-oriented. Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permission levels for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global network of networks often referred to as the Internet, that network will be used in many of the examples herein. However, it should be understood that the networks that the one or more implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a browser for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the data stored in the MTS; however, other alternative configurations may be used instead.

In one embodiment, system 116 implements a web-based customer relationship management (CRM) system. For example, in one embodiment, system 116 includes application servers configured to implement and execute CRM software applications as well as provide related data, code, forms, web pages and other information to and from user systems 112 and to store to, and retrieve from, a database system related data, objects, and Web page content. With a multi-tenant system, data for multiple tenants may be stored in the same physical database object; however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 10, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 10 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 11 also illustrates environment 110. However, in FIG. 11 elements of system 116 and various interconnections in an embodiment are further illustrated. FIG. 11 shows that user system 112 may include processor system 1110, memory system 1111, input system 112C, and output system 112D. FIG. 11 shows network 114 and system 116. FIG. 11 also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 10. Regarding user system 112, processor system 1110 may be any combination of one or more processors. Memory system 1111 may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks.

As shown by FIG. 11, system 116 may include a network interface 115 (of FIG. 10) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases, or in distributed memory as described herein.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. A detailed description of some PL/SOQL language embodiments is discussed in commonly owned, co-pending U.S. Provisional Patent App. No. 60/828,192, entitled Programming Language Method And System For Extending APIs To Execute In Conjunction With Database APIs, filed Oct. 4, 2006, which is incorporated in its entirety herein for all purposes. Invocations to applications may be detected by one or more system processes, which manages retrieving application metadata 216 for the subscriber making the invocation and executing the metadata as an application in a virtual machine.

Each application server 200 may be coupled for communications with database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, an interface system implementing a load balancing function (e.g., an F5 Big-IP load balancer) is coupled for communication between the application servers 200 and the user systems 112 to distribute requests to the application servers 200. In one embodiment, the load balancer uses a "least connections" algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant and handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be shared organization-wide or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled Custom Entities and Fields in a Multi-Tenant Database System, is hereby incorporated herein by reference, and teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for inferring reporting relationships in an organization from contact information, the contact information stored as a plurality of contact records in a database system, each contact record having a defined set of entities, including at least a name, a title, and an organization name, comprising:
   selecting, by the database system, an organization name;
   identifying, by the database system, a plurality of contact records having the selected organization name;
   assigning, by the database system, a rank to each of the identified contact records, the rank corresponding with a title on the corresponding contact record;
   inferring, by the database system, a reporting relationship from a first contact associated with a rank to a second contact associated with a different rank, based on a probabilistic analysis calculating a confidence score associated with the reporting relationship between the first contact record and the second contact record of the identified contact records;
   determining, by the database system, whether the confidence score associated with the reporting relationship exceeds a confidence threshold; and
   storing, by the database system, the reporting relationship in at least one of metadata associated with the identified contact records and a field associated with the identified contact records in response to a determination that the confidence score associated with the reporting relationship exceeds the confidence threshold.

2. The method of claim 1, the step of assigning a rank further comprising:
   identifying a plurality of organizational levels in the organization, ranging from a lowest level to a highest level; and
   associating an increasing rank with each level starting with the lowest level to the highest level.

3. The method of claim 2, the step of determining reporting relationships further comprising:
   for each level which comprises at least one contact at one rank below the current rank, counting the number of contacts at the current rank and the number of contacts at one rank below the current rank;
   for each level, determining an average reporting ratio as the number of contacts at one rank below the current rank divided by the number of contacts at the current rank;
   for each level, determining the confidence score based on the probability distribution divided by the average reporting ratio divided by the number of contacts at the current rank;
   for each level, if the confidence score is acceptable, for each contact A at one rank below the current rank, and for each contact B at the current rank, identifying that contact A reports to contact B.

4. The method of claim 3, further comprising: updating contact records for contact A and contact B.

5. The method of claim 3, further comprising: performing the step of determining reporting relationships iteratively through each level of the organization.

6. The method of claim 5, further comprising: performing the step of determining reporting relationships iteratively starting with the highest level down to the lowest level.

7. The method of claim 3, further comprising: move to the next level if the number of contacts at the current rank is zero, and the current rank is a rank for which reporting relationships are determined.

8. The method of claim 3, further comprising:
counting the number of contacts at two ranks below the current rank;
determining the average reporting ratio as the number of contacts at two ranks below the current rank divided by the number of contacts at the current rank, if the number of contacts at the current rank is not zero, and the number of contacts at one rank below the current rank is zero; and
if the confidence score is acceptable, for each contact A at two ranks below the current rank, and for each contact B at the current rank, identifying that contact A reports to contact B.

9. The method of claim 1, the defined set of entities further including a location, further comprising:
identifying at least one chief executive level position in a title field of the identified contact records, and assigning the chief executive level position a top rank;
identifying a department for each identified contact record, the department based on the title;
sorting the identified contact records by department and location thereby creating a plurality of record subsets, each subset identifying a specific department/location pair;
identifying, for each department/location subset, the contact records having the highest rank below the top rank; and
determining reporting relationships between the contact record having a top rank and the contact records having the highest rank below the top rank using a probabilistic analysis.

10. The method of claim 9, further comprising:
determining an average reporting ratio as the union of all contacts having the highest rank below the top rank divided by the number of contacts at the top rank;
determining the confidence score based on the probability distribution divided by the average reporting ratio divided by the number of contacts at the top rank;
if the confidence score is acceptable, for each pair of contacts (A, B) in the set having the intersection of the union of all contacts having the highest rank below the top rank with the number of contacts at the top rank, identifying that contact A reports to contact B.

11. A non-transitory computer-readable medium encoded with instructions for inferring reporting relationships in an organization from contact information, the contact information stored as a plurality of contact records in a database system, each contact record having a defined set of entities, including at least a name, a title, and an organization name, the instructions when executed by a processor cause the processor to carry out the steps of:
selecting, with the database system, an organization name;
identifying a plurality of contact records in the database system having the selected organization name;
assigning, by the database system, a rank to each of the identified contact records, the rank corresponding with a title on the corresponding contact record; and
inferring, by the database system, a reporting relationship from a first contact associated with a rank to a second contact associated with a different rank, based on a probabilistic analysis calculating a confidence score associated with the reporting relationship between the first contact record and the second contact record of the identified contact records;
determining whether the confidence score associated with the reporting relationship exceeds a confidence threshold; and
storing the reporting relationship in at least one of metadata associated with the identified contact records and a field associated with the identified contact records in response to a determination that the confidence score associated with the reporting relationship exceeds the confidence threshold.

12. The computer-readable medium of claim 11, the step of assigning a rank further comprising:
identifying a plurality of organizational levels in the organization, ranging from a lowest level to a highest level; and
associating an increasing rank with each level starting with the lowest level to the highest level.

13. The computer-readable medium of claim 12, the step of determining reporting relationships further comprising:
for each level which comprises at least one contact at one rank below the current rank, counting the number of contacts at the current rank and the number of contacts at one rank below the current rank;
for each level, determining the average reporting ratio as the number of contacts at one rank below the current rank divided by the number of contacts at the current rank;
for each level, determining the confidence score based on the probability distribution divided by the average reporting ratio divided by the number of contacts at the current rank;
for each level, if the confidence score is acceptable, for each contact A at one rank below the current rank, and for each contact B at the current rank, identifying that contact A reports to contact B.

14. The computer-readable medium of claim 13, further comprising: updating contact records for contact A and contact B.

15. The computer-readable medium of claim 13, further comprising: performing the step of determining reporting relationships iteratively through each level of the organization.

16. The computer-readable medium of claim 15, further comprising: performing the step of determining reporting relationships iteratively starting with the highest level down to the lowest level.

17. The computer-readable medium of claim 13, further comprising: move to the next level if the number of contacts at the current rank is zero, and the current rank is a rank for which reporting relationships are determined.

18. The computer-readable medium of claim 13, further comprising:
counting the number of contacts at two ranks below the current rank;
determining the average reporting ratio as the number of contacts at two ranks below the current rank divided by the number of contacts at the current rank, if the number of contacts at the current rank is not zero, and the number of contacts at one rank below the current rank is zero; and
if the confidence score is acceptable, for each contact A at two ranks below the current rank, and for each contact B at the current rank, identifying that contact A reports to contact B.

19. The computer-readable medium of claim 11, the defined set of entities further including a location, further comprising:

identifying at least one chief executive level position in a title field of the identified contact records, and assigning the chief executive level position a top rank;

identifying a department for each identified contact record, the department based on the title;

sorting the identified contact records by department and location thereby creating a plurality of record subsets, each subset identifying a specific department/location pair;

identifying, for each department/location subset, the contact records having the highest rank below the top rank; and determining reporting relationships between the contact record having a top rank and the contact records having the highest rank below the top rank using a probabilistic analysis.

20. The computer-readable medium of claim 19, further comprising:

determining an average reporting ratio as the union of all contacts having the highest rank below the top rank divided by the number of contacts at the top rank;

determining the confidence score based on the probability distribution divided by the average reporting ratio divided by the number of contacts at the top rank;

if the confidence score is acceptable, for each pair of contacts (A, B) in the set having the intersection of the union of all contacts having the highest rank below the top rank with the number of contacts at the top rank, identifying that contact A reports to contact B.

21. An apparatus for inferring reporting relationships in an organization from contact information, the contact information stored as a plurality of contact records in a database system, each contact record having a defined set of entities, including at least a name, a title, and an organization name, comprising:

a processor; and one or more stored sequences of instructions which, when executed by the processor, cause the processor to carry out the steps of:

selecting, with the database system, an organization name;

identifying a plurality of contact records in the database system having the selected organization name;

assigning, by the database system, a rank to each of the identified contact records, the rank corresponding with a title on the corresponding contact record; and inferring, by the database system, a reporting relationship from a first contact associated with a rank to a second contact associated with a different rank, based on a probabilistic analysis calculating a confidence score associated with the reporting relationship between the first contact record and the second contact record of the identified contact records;

determining whether the confidence score associated with the reporting relationship exceeds a confidence threshold; and storing the reporting relationship in at least one of metadata associated with the identified contact records and a field associated with the identified contact records in response to a determination that the confidence score associated with the reporting relationship exceeds the confidence threshold.

\* \* \* \* \*